United States Patent
Seok et al.

(10) Patent No.: US 10,930,970 B2
(45) Date of Patent: Feb. 23, 2021

(54) COMPOSITE ELECTROLYTE FOR LITHIUM METAL BATTERY, PREPARING METHOD THEREOF, AND LITHIUM METAL BATTERY COMPRISING THE SAME

(71) Applicant: Samsung SDI Co., Ltd., Yongin-si (KR)

(72) Inventors: Hoon Seok, Yongin-si (KR); Junghyun Nam, Yongin-si (KR); Bokkyu Jeon, Yongin-si (KR); Yeonjoo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 99 days.

(21) Appl. No.: 16/300,029

(22) PCT Filed: Sep. 28, 2016

(86) PCT No.: PCT/KR2016/010833
§ 371 (c)(1),
(2) Date: Nov. 8, 2018

(87) PCT Pub. No.: WO2017/217596
PCT Pub. Date: Dec. 21, 2017

(65) Prior Publication Data
US 2019/0148764 A1    May 16, 2019

(30) Foreign Application Priority Data

Jun. 14, 2016    (KR) .................... 10-2016-0073832

(51) Int. Cl.
*H01M 10/056* (2010.01)
*H01M 10/052* (2010.01)
(Continued)

(52) U.S. Cl.
CPC ....... *H01M 10/056* (2013.01); *H01M 10/052* (2013.01); *H01M 10/0565* (2013.01);
(Continued)

(58) Field of Classification Search
CPC ............. H01M 10/052; H01M 10/056; H01M 10/0568; H01M 2300/0071; H01M 2300/0082; H01M 2300/0091
See application file for complete search history.

(56) References Cited

U.S. PATENT DOCUMENTS 9,647,255 B2    5/2017    Choi et al.
2004/0214088 A1    10/2004    Lee et al.
(Continued)

FOREIGN PATENT DOCUMENTS

CN        1610177 A        4/2005
CN        102738442 B      4/2016
(Continued)

OTHER PUBLICATIONS

J. E. Weston and B. C. H. Steele. Effects of Inert Fillers on the Mechanical and Electrochemical Properties of Lithium Salt-Poly(Ethylene Oxide) Polymer Electrolytes, Solid State Ionics 7 (1982) 75-79.*

(Continued)

*Primary Examiner* — Carlos Barcena
(74) *Attorney, Agent, or Firm* — Lewis Roca Rothgerber Christie LLP (57) ABSTRACT

Disclosed are a composite electrolyte, including: a network web formed of a fiber containing a polymer and inorganic particles, wherein a content of the inorganic particles is 5 wt % or less based on a total weight of the composite electrolyte, a preparing method thereof, and a lithium metal battery including the same.

11 Claims, 9 Drawing Sheets

(51) Int. Cl.
*H01M 10/0565* (2010.01)
*H01M 10/0568* (2010.01)

(52) U.S. Cl.
CPC .............. *H01M 10/0568* (2013.01); *H01M 2300/0071* (2013.01); *H01M 2300/0082* (2013.01); *H01M 2300/0091* (2013.01); *Y02E 60/10* (2013.01); *Y02T 10/70* (2013.01)

(56) References Cited

U.S. PATENT DOCUMENTS

| | | | | |
|---|---|---|---|---|
| 2005/0053840 | A1* | 3/2005 | Jo | H01M 10/0525 |
| | | | | 429/247 |
| 2006/0286446 | A1* | 12/2006 | Chun | H01M 2/16 |
| | | | | 429/142 |
| 2012/0225358 | A1* | 9/2012 | Seo | H01M 2/145 |
| | | | | 429/246 |
| 2013/0115519 | A1* | 5/2013 | Lee | H01M 2/1653 |
| | | | | 429/252 |
| 2014/0072700 | A1* | 3/2014 | Kim | D01D 5/0007 |
| | | | | 427/77 |
| 2015/0311492 | A1 | 10/2015 | Wang et al. | |
| 2015/0318570 | A1 | 11/2015 | Choi et al. | |
| 2016/0013515 | A1 | 1/2016 | Lee et al. | |
| 2016/0087306 | A1 | 3/2016 | Lee et al. | |

FOREIGN PATENT DOCUMENTS

| | | |
|---|---|---|
| KR | 2002-0078318 A | 10/2002 |
| KR | 10-0496641 B1 | 6/2005 |
| KR | 10-2014-0081414 A | 7/2014 |
| KR | 10-2016-0008369 A | 1/2016 |
| KR | 10-2016-0034173 A | 3/2016 |
| KR | 10-2014-0092158 A | 7/2017 |

OTHER PUBLICATIONS

J. Fan and P. S. Fedkiw. Composite Electrolytes Prepared from Fumed Silica, Polyethylene Oxide Oligomers, and Lithium Salts (1997) J. Electrochem. Soc. 144, 399-408.*

International Search Report of corresponding PCT/KR2016/010833, dated Feb. 10, 2017, 5 pages.

Written Opinion of the International Searching Authority of corresponding PCT/KR2016/010833, dated Feb. 10, 2017, 11 pages.

Lee, et al., "Effect of silica on the interfacial stability of the PEO-based polymer electrolytes," Polymer Bulletin, 2002, vol. 49, No. 1, pp. 63-68.

Scrosati, et al., "Impedance spectroscopy study of PEObased nanocomposite polymer electrolytes," Journal of the Electrochemical Society, 2000, vol. 1, No. 5, pp. 1718-1721.

Chinese Office Action dated Nov. 30, 2020 issued in corresponding CN Application No. 201680084598.4 (8 pages) and English Language Translation (9 pages).

* cited by examiner

COMPOSITE ELECTROLYTE FOR LITHIUM METAL BATTERY, PREPARING METHOD THEREOF, AND LITHIUM METAL BATTERY COMPRISING THE SAME

CROSS-REFERENCE TO RELATED APPLICATION(S)

This application is a U.S. National Phase Patent Application of International Application Number PCT/KR2016/010833, filed on Sep. 28, 2016, which claims priority of Korean Patent Application Number 10-2016-0073832, filed on Jun. 14, 2016, the entire contents of all of which are incorporated herein by reference.

TECHNICAL FIELD

The present disclosure relates to a composite electrolyte for a lithium metal battery, a preparing method thereof, and a lithium metal battery including the same.

BACKGROUND ART

Lithium secondary batteries are high-performance batteries having a highest energy density among other currently available secondary batteries, and are applicable in various fields such as electric vehicles.

A lithium secondary battery may use a lithium thin film as a negative electrode. In such a lithium secondary battery, a solid electrolyte serving as both a separation membrane and an electrolyte is used. However, when a conventional solid electrolyte and a lithium thin film are used as a negative electrode, the growth of dendrite formed on the lithium thin film cannot be controlled, and thus battery performance may deteriorate. Therefore, there is a need for improvement in this regard.

DESCRIPTION OF EMBODIMENTS

Technical Problem

An aspect is to provide a composite electrolyte for a lithium metal battery having improved mechanical strength and a preparing method thereof.

Another aspect is to provide a lithium metal battery having improved cell performance by employing the composite electrolyte.

Solution to Problem

According to an aspect of the present disclosure, there is provided a composite electrolyte, including: a network web formed of a fiber containing a polymer and inorganic particles, wherein a content of the inorganic particles is 5 wt % or less based on a total weight of the composite electrolyte.

According to another aspect of the present disclosure, there is provided a method of preparing a composite electrolyte, including: preparing a composition including a polymer, inorganic particles, and an organic solvent; and electrospinning the composition to prepare the aforementioned composite electrolyte.

According to still another aspect of the present disclosure, there is provided a lithium metal battery, including: a positive electrode; a negative electrode; and the aforementioned composite electrolyte interposed between the positive electrode and the negative electrode.

Advantageous Effects of Disclosure

According to an embodiment, a composite electrolyte for a lithium metal battery has improved mechanical properties, and can effectively suppress the growth of dendrite on the surface of a lithium metal negative electrode. When this composite electrolyte is employed, a lithium metal battery having improved cell performance can be manufactured.

MODE OF DISCLOSURE

Hereinafter, a composite electrolyte for a lithium metal battery, a preparing method thereof, and a lithium metal battery employing the same will be described in detail with reference to the attached drawings.

There is provided a composite electrolyte for a lithium metal battery, including: a network web formed of a fiber containing a polymer and inorganic particles, wherein a content of the inorganic particles is 5 wt % or less based on a total weight of the composite electrolyte.

The content of the inorganic particles is 0.1 wt % to 5 wt %, for example, 1 wt % to 5 wt %. When the content of the inorganic particles is 5 wt % or less, the fiber contains the polymer and the inorganic particles, and thus a composite electrolyte having improved mechanical properties may be prepared. When the content of the inorganic particles is more than 5 wt %, the inorganic particles do not exist in the network web formed of the fiber constituting the composite electrolyte, and thus a mechanical strength improvement effect is insignificant.

In a lithium metal battery using a lithium metal thin film as a negative electrode, a solid electrolyte may be used. In this case, the solid electrolyte is obtained by casting and drying an electrolyte composition containing a polymer and inorganic particles. However, when such a solid electrolyte is employed, the mechanical properties of the solid electrolyte do not reach a satisfactory level, and thus the growth of dendrite in a negative electrode cannot be effectively controlled, thereby deteriorating the performance of a lithium metal battery or causing a short circuit.

Thus, the present inventors provide a composite electrolyte having improved mechanical properties by controlling the composition of an electrolyte and the method of preparing an electrolyte. The composite electrolyte includes a network web formed of a fiber by carrying out electrospinning using a composition for an electrolyte while controlling the content of inorganic particles to be 5 wt % or less based on the total weight of the composite electrolyte. Since the composite electrolyte has a network web structure formed of a fiber, the composite electrolyte exhibits hardness and elastic modulus to such a degree that the growth of dendrite formed on a lithium metal can be suppressed. In the present specification, the network web represents a composite electrolyte membrane in which inorganic particles are comprised in a fiber.

As the inorganic particles, at least one selected from $SiO_2$, $TiO_2$, ZnO, $Al_2O_3$, $BaTiO_3$, and cage-structured silsesquioxane is used.

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 1.

[Formula 1]

In Formula 1, $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 1, a, b, and c are each an integer of 1 to 20, and a, b, and c are selected such that the sum thereof k (=a+b+c) satisfies 6≤k≤20.

The cage-structured silsesquioxane may be a compound represented by Formula 2 or a compound represented by Formula 3.

[Formula 2]

In Formula 2, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

[Formula 3]

In Formula 3, $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

According to an embodiment, the cage-structured silsesquioxane may be a compound in which $R_1$ to $R_7$ may be a haptaisobutyl group. For example, the cage-structured silsesquioxane may be octaisobutyl-t8-silsesquioxane.

The polymer of the composite electrolyte according to an embodiment is a material that is soluble in an organic solvent to such a degree that electrospinning can be applied. For example, the polymer may be at least one selected from polyethylene oxide, polyurethane, polyvinylidene fluoride (PVDF), poly(vinylidenefluonde-co-hexafluoropropyene), perfluorinated polymer, polyvinyl chloride, polyvinylene chloride and a copolymer containing repeating units constituting these polymers, a polyethylene glycol derivative including polyethylene glycol dialkylether and polyethylene glycol dialkylester, poly(oxymethylene-oligo-oxyethylene), polypropylene oxide, polyvinyl acetate, poly(vinylpyrrolidone-vinyl acetate), polystyrene, styrene-acrylonitrile copolymer, polyacrylonitrile copolymer including acrylonitrile-methyl methacrylate copolymer, polymethyl methacrylate, polymethyl methacrylate copolymer, polysulfone, polyetherketone, polyacrylonitrile, polyamide, polyimide, polyamide-imide, polymetaphenylene isophthalamide, polyethylene terephthalate, polyethylene naphthalate, polyether urethane, cellulose acetate, cellulose acetate butyrate, and cellulose acetate propionate.

The weight average molecular weight of the polymer is 400,000 to 1,000,000. When the weight average molecular weight thereof is within this range, it is possible to prepare a composite electrolyte having excellent hardness and elastic modulus.

The elastic modulus of the composite electrolyte at room temperature (25° C.) is 0.03 GPa or more, for example, 1 GPa to 50 GPa. The hardness of the composite electrolyte at room temperature (25° C.) is 0.02 GPa or more, for example, 0.1 GPa to 1 GPa. The composite electrolyte can secure ion conductivity and mechanical properties necessary for battery performance at room temperature.

The ion conductivity of the composite electrolyte at room temperature (25° C.) may be $1 \times 10^{-4}$ S/cm or more, for example, $5 \times 10^{-4}$ S/cm or more, specifically, $1 \times 10^{-3}$ S/cm or more.

The average particle diameter of the inorganic particles is 15 nm to 25 nm. When the inorganic particles having such an average particle diameter are used, the mechanical properties of the composite electrolyte are improved without deteriorating the ion conductivity of the composite electrolyte.

In the composite electrolyte according to an embodiment, the diameter of the fiber is 500 nm to 5 μm. The composite electrolyte containing a fiber having such a diameter range is excellent in the dendrite growth inhibiting effect at the upper portion of a lithium metal thin film.

The composite electrolyte further includes a lithium salt. For example, the lithium salt may be at least one selected from $LiSCN$, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

The content of the lithium salt is 10 to 70 parts by weight, for example, 20 to 50 parts by weight, based on 100 parts by weight of the fiber. When the content of the lithium salt is within the above range, the ionic conductivity of the composite electrolyte is excellent.

According to an embodiment, the composite electrolyte further includes at least one selected from an organic solvent and an ionic liquid. The organic solvent may be a carbonate compound, a glyme compound, a dioxolane compound, dimethyl ether, or 1,1,2,2-tetrafluoroethyl 2,2,3,3-tetrafluoropropyl ether. This organic solvent may be at least one selected from ethylene carbonate, propylene carbonate, dimethyl carbonate, diethyl carbonate, ethyl methyl carbonate, fluoroethylene carbonate, gamma butyrolactone, dimethoxyethane, diethoxyethane, dimethylene glycol dimethyl ether, trimethylene glycol dimethyl ether, tetraethylene glycol dimethyl ether, polyethylene glycol dimethyl ether, succinonitrile, sulfone, dimethyl sulfone, ethyl methyl sulfone, diethyl sulfone, adiponitrile, and 1,1,2,2-tetrafluoroethyl 2,2,3,3-tetrafluoropropyl ether.

In the composite electrolyte according to an embodiment, the polymer is polyethylene oxide, the inorganic particles are $TiO_2$ particles, and the lithium salt is lithium bis(trifluoromethanesulfonyl) imide (LiTFSI).

The thickness of the composite electrolyte is 5 μm to 30 μm. The composite electrolytes satisfying such a thickness range are excellent in mechanical properties.

Hereinafter, a method of preparing a composite electrolyte for a lithium metal battery according to an embodiment will be described.

First, a composition for forming a composite electrolyte is prepared by mixing a polymer, a lithium salt, inorganic particles, and a solvent.

The polymer is at least one selected from polyethylene oxide, polyurethane, polyvinylidene fluoride (PVDF), poly (vinylidenefluoride-co-hexafluoropropylene), perfluorinated polymer, polyvinyl chloride, polyvinylene chloride and a copolymer containing repeating units constituting these polymers, a polyethylene glycol derivative including polyethylene glycol dialkylether and polyethylene glycol dialkylester, poly(oxymethylene-oligo-oxyethylene), polypropylene oxide, polyvinyl acetate, poly(vinylpyrrolidone-vinyl acetate), polystyrene, styrene-acrylonitrile copolymer, polyacrylonitrile copolymer including acrylonitrile-methyl methacrylate copolymer, polymethyl methacrylate, polymethyl methacrylate copolymer, polysulfone, polyetherketone, polyacrylonitrile, polyamide, polyimide, polyamide-imide, polymetaphenylene isophthalamide, polyethylene terephthalate, polyethylene naphthalate, polyether urethane, cellulose acetate, cellulose acetate butyrate, and cellulose acetate propionate.

The network web formed of the fiber may be obtained by spinning the composition for the composite electrolyte. In the spinning of the composition, an electrospinning apparatus shown in FIG. 1A may be used.

The viscosity of the composition for forming the composite electrolyte is 100 cps to 1,000 cps. When the composition having such viscosity is used, a composite electrolyte excellent in workability and film formability may be prepared.

As the spinning method, any one selected from electrospinning, air electrospinning, electrospraying, centrifugal electrospinning, and flash electrospinning.

Figure 1A:
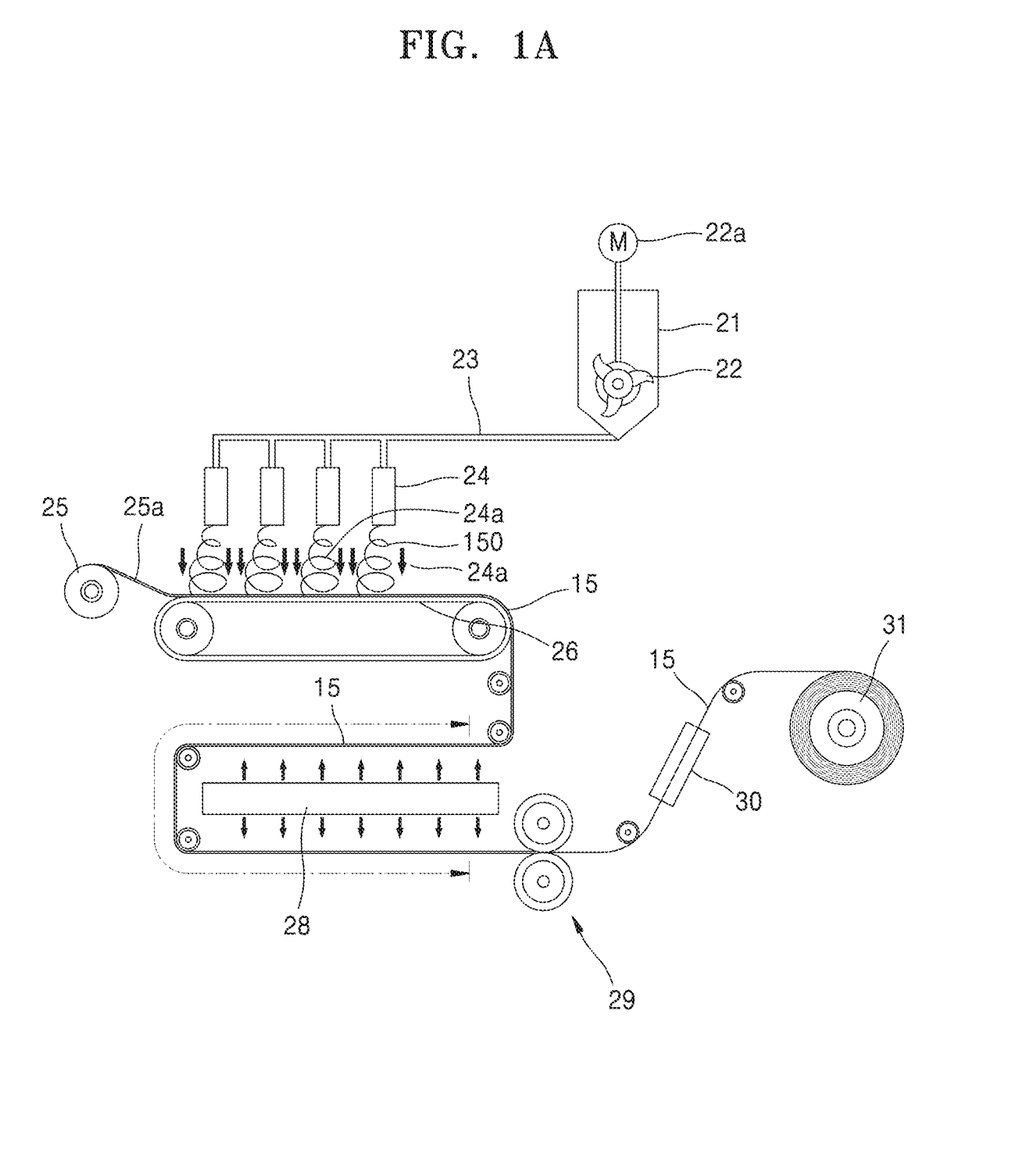
FIG. 1A illustrates an electrospinning apparatus according to an embodiment.

FIG. 1A illustrates a process of manufacturing a network web used as a composite electrolyte according to the present disclosure.

Referring to FIG. 1A, a network web 15 formed of a fiber is prepared by, for example, air electrospinning (AES). That is, a mixed spinning solution having sufficient viscosity is spun through spinning nozzles 24 of the electrospinning apparatus shown in FIG. 1A. A high-voltage electrostatic force of 90 kV to 120 kV is applied between the spinning nozzles 24 and a collector 26 to spin ultrafine nanofibers 150 onto the collector 26. In this case, for each of the spinning nozzles 24, air is sprayed, thereby preventing the spun ultrafine nanofibers 150 from scattering without being captured.

The air-spraying electrospinning apparatus used in the present disclosure includes a mixing tank 21 provided therein with a stirrer 22 that uses a mixing motor 22a using air pressure as a driving source to prevent a phase separation until the spinning of the composition for the composite electrolyte, and a multi-hole nozzle pack (not shown) in which the plurality of spinning nozzles 24 connected to a high voltage generator are arranged in a matrix form. The mixed spinning solution discharged from the mixing tank 21 to the plurality of spinning nozzles 24 to a metering pump (not shown) through a conveying pipe 23 is ejected into nanofibers 150 while passing through the electrically charged spinning nozzles 24, and these nanofibers 150 are accumulated on the conveyor-type grounded collector 26 moving at a constant speed, so as to form the network web 15.

The thickness of the network web formed by the above process is about 5 μm to about 20 μm. When the thickness of the network web is within the above range, the network web is stable in a battery fine short circuit due to mechanical strength.

There is provided a lithium metal battery including a positive electrode; a negative electrode; and the aforementioned composite electrolyte interposed therebetween.

Figure 1B:
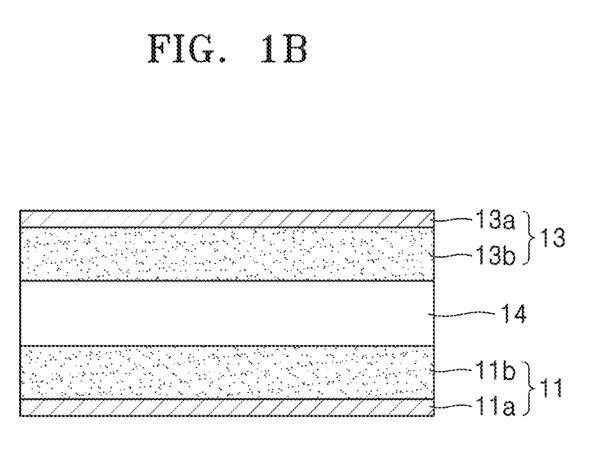
FIG. 1B is a schematic cross-sectional view illustrating a structure of a negative electrode for a lithium metal battery according to an embodiment.

Referring to FIG. 1B, a lithium metal battery includes a positive electrode 11, a composite electrolyte 14, and a negative electrode 13. The positive electrode 11 includes a positive electrode current collector 11a and a positive electrode active material layer 11b formed on one surface of the positive electrode current collector 11a. The negative electrode 13 includes a negative electrode current collector 13a and a negative electrode active material layer 13b formed on one surface of the negative electrode current collector 13a.

The lithium metal battery according to an embodiment may further include a separator. As the separator, a multi-layered film of two or more selected from polyethylene, polypropylene, and polyvinylidene fluoride may be used. Further, as the separator, a mixed multi-layered film separator such as a three-layered separator of polyethylene/polypropylene/polyethylene or a three-layered separator of polypropylene/polyethylene/polypropylene may be used. An electrolyte including a lithium salt and an organic solvent may be added to the separator.

The positive electrode may be a porous positive electrode. The porous positive electrode includes a positive electrode having pores, or a positive electrode into which a liquid electrolyte can be permeated by a capillary phenomenon or the like because the formation of pores is not intentionally excluded.

For example, the porous positive electrode includes a positive electrode obtained by applying and drying a positive electrode active material composition including a positive electrode active material, a conducting agent, a binder, and a solvent. The positive electrode obtained in this way may have pores between positive electrode active material particles. This porous positive electrode may be impregnated with a liquid electrolyte.

According to another embodiment, the positive electrode may include a liquid electrolyte, a gel electrolyte, or a solid electrolyte. The liquid electrolyte, the gel electrolyte, and the solid electrolyte may be used without limitation as long as they can be used as an electrolyte of a lithium metal battery in the related art and do not deteriorate a positive electrode active material by the reaction with the positive electrode active material during a charging-discharging process.

The lithium metal negative electrode may use a lithium metal thin film or a lithium metal alloy thin film. The thickness of the lithium metal thin film or the lithium metal alloy thin film may be 100 μm or less. For example, the lithium metal battery may obtain stable cycle characteristics even for a lithium metal thin film or lithium metal alloy thin film having a thickness of 100 μm or less. For example, in the lithium metal battery, the thickness of the lithium metal thin film or the lithium metal alloy thin film may be 80 μm or less, for example, 60 μm or less, specifically, 0.1 μm to 60 μm. In the lithium metal battery in the related art, when the thickness of the lithium metal thin film or the lithium metal alloy thin film decreases to 100 μm or less, the thickness of the lithium metal battery deteriorated by side reactions or formation of dendrite increases, and thus it is difficult to implement a lithium metal battery exhibiting stable cycle characteristics. However, when a protective film according to an embodiment is used, it is possible to manufacture a lithium metal battery having stable cycle characteristics.

The lithium metal battery according to an embodiment may further include a general electrolyte in addition to the composite electrolyte.

The general electrolyte may further include at least one selected from a liquid electrolyte containing at least one selected from an organic solvent, an ionic liquid, and a lithium salt, a solid electrolyte, a gel electrolyte, and a polymer ionic liquid. Like this, when the general electrolyte further includes at least one selected from a liquid electrolyte, a polymer ionic liquid, a solid electrolyte, and a gel electrolyte, the conductivity and mechanical properties of the electrolyte can be further improved.

The liquid electrolyte may include an organic solvent.

Examples of the organic solvent include a carbonate compound, a glyme compound, and a dioxolane compound. Examples of the carbonate compound include ethylene carbonate, propylene carbonate, dimethyl carbonate, fluoroethylene carbonate, diethyl carbonate, or ethyl methyl carbonate.

Examples of the glyme compound include poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

Examples of the dioxolane compound include 3-dioxolane, 4,5-diethyl-dioxolane, 4,5-dimethyl-dioxolane, 4-methyl-1,3-dioxolane, and 4-ethyl-1,3-dioxolane. Examples of the organic solvent include 2,2-dimethoxy-2-phenylacetophenone, dimethyl ether (DME), 1,2-dimethoxyethane, 1,2-diethoxyethane, tetrahydrofuran, gamma-butyrolactone, and 1,1,2,2-tetrafluoroethyl 2,2,3,3-tetrafluoropropyl ether.

The gel electrolyte may be used without limitation as long as it is well known as an electrolyte having a gel form in the related art. The gel electrolyte may include a polymer and a polymer ionic liquid. Here, the polymer may be a graft (block) copolymer.

The solid electrolyte may be an organic solid electrolyte or an inorganic solid electrolyte.

Examples of the organic solid electrolyte may include polyethylene derivatives, polyethylene oxide derivatives, polypropylene oxide derivatives, phosphate ester polymers, polyester sulfide, polyvinyl alcohol, polyvinylidene fluoride, and polymers containing ionic dissociation groups.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ ($0.1 \leq x \leq 0.9$), $Li_{1+x}Hf_{2-x}Al_x(PO_4)_3$ ($0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M is a rare earth element such as Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ ($X \leq 0.8$, $0 \leq Y \leq 1.0$, M is Nd, Sm, Eu, Gd, Tb, Dy, Ho, Er, Tm, or Yb), $Li_{1+x+y}Q_xTi_{2-x}Si_yP_{3-y}O_{12}$ ($0 < x \leq 0.4$, $0 < y \leq 0.6$, Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M is Nb or Ta), and $Li_{7+x}A_xLa_{3-x}Zr_2O_{12}$ ($0 < x < 3$, A is Zn).

The lithium metal battery according to an embodiment may have an operating voltage of 4.0 V to 5.0 V, for example, 4.5 V to 5.0 V.

Components constituting the lithium metal battery according to an embodiment and a method of manufacturing the lithium metal battery having such components will be described in more detail as follows.

The positive electrode active material for preparing a positive electrode may further include at least one selected from lithium cobalt oxide, lithium nickel cobalt manganese oxide, lithium nickel cobalt aluminum oxide, lithium iron phosphate oxide, and lithium manganese oxide, but the positive electrode active material is not limited thereto, and any suitable positive electrode active material available in the art may be used.

For example, the positive electrode active material may be a compound represented by any of the following formulas: $Li_aA_{1-b}R_bD_2$ (where, $0.90 \leq a \leq 1.8$ and $0 \leq b \leq 0.5$); $Li_aE_{1-b}R_bO_{2-c}D_c$ (where $0.90 \leq a \leq 1.8$, $0 \leq b \leq 0.5$, and $0 \leq c \leq 0.05$); $LiE_{2-b}R_bO_{4-c}D_c$ (where $0 \leq b \leq 0.5$ and $0 \leq c \leq 0.05$); $Li_aNi_{1-b-c}Co_bR_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}X_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bR_cO_{2-\alpha}X_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bR_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}X_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bR_cO_{2-\alpha}X_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiM'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; M' is Cr, V, Fe, Sc, Y, or a combination thereof; and J is V, Cr, Mn, Co, Ni, Cu, or a combination thereof.

For example, the positive electrode active material may be a compound represented by Formula 1, a compound represented by Formula 2, or a compound represented by Formula 3.

$Li_aNi_bCo_cMn_dO_2$ [Formula 1]

In Formula 1, $0.90 \leq a \leq 1.8$, $0 \leq b \leq 0.9$, $0 \leq c \leq 0.5$, and $0 \leq d \leq 0.5$.

$Li_2MnO_3$ [Formula 2]

$LiMO_2$ [Formula 3]

In Formula 3, M is Mn, Fe, Co, or Ni.

A positive electrode is prepared by the following method.

A positive electrode active material composition in which a positive electrode active material, a binder, and a solvent is mixed is prepared.

A conducting agent may be added to the positive electrode active material composition.

The positive electrode active material composition is directly applied onto a metal current collector and dried to obtain a positive electrode plate. Alternately, the positive electrode active material composition is cast on a separate support, and then a film separated from the support is laminated on a metal current collector to obtain a positive electrode plate.

The binder is a component that assists the bonding between an active material and a conducting agent and the bonding to a current collector, and is added in an amount of 1 to 50 parts by weight based 100 parts by weight of a positive electrode active material. Non-limiting examples of the binder may include Polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, Ethylene-propylene-diene terpolymer (EPDM), sulfonated EPDM, styrene-butylene rubber, fluorine rubber, and various copolymers. The content of the binder is 2 to 5 parts by weight based on 100 parts by weight of the total weight of the positive electrode active material. When the content of the binder is within the above range, the binding force of the active material layer to the current collector is good.

The conducting agent is not particularly limited as long as it has electrical conductivity without causing a chemical change in the corresponding battery. Examples of the conducting agent may include graphite such as natural graphite or artificial graphite; carbonaceous materials such as carbon black, acetylene black, Ketjen black, channel black, furnace black, lamp black, and thermal black; conductive fibers such as carbon fiber and metal fiber; metal powder such as carbon fluoride powder, aluminum powder, and nickel powder; conductive whisky such as zinc oxide and potassium titanate; conductive metal oxide such as titanium oxide; and conductive materials such as polyphenylene derivatives.

The content of the conducting agent is 1 to 10 parts by weight, for example, 2 to 5 parts by weight, based on 100 parts by weight of the total weight of the positive electrode active material. When the content of the conducting agent is within the above range, the conductivity characteristics of the finally obtained electrode are excellent.

A non-limiting example of the solvent includes N-methylpyrrolidone.

The content of the solvent is 100 to 2000 parts by weight based on 100 parts by weight of the total weight of the positive electrode active material. When the content of the solvent is within the above range, a work for forming an active material layer is easy.

As described above, the negative electrode may be a lithium metal thin film or a lithium alloy thin film.

The lithium alloy may include lithium and a metal/metalloid alloyable with lithium. Examples of the metal/metalloid alloyable with lithium may include Si, Sn, Al, Ge, Pb, Bi, Sb, a Si—Y alloy (where, Y is an alkali metal, an alkali earth metal, a Group 13 element, a Group 14 element, a transition metal, a rare-earth element, or a combination thereof, but not Si), and a Sn—Y alloy (where, Y is an alkali metal, an alkali earth metal, a Group 13 element, a Group 14 element, a transition metal, a rare-earth element, or a combination thereof, but not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The composite electrolyte according to an embodiment is used as the electrolyte. In addition, a separator and/or a lithium salt-containing non-aqueous electrolyte, which are generally used in lithium metal batteries, may be used as the electrolyte.

The separator is an insulating thin film having high ion permeability and high mechanical strength. The pore diameter of the separator may be in a range of about 0.01 μm to about 10 μm, and the thickness of the separator may be in a range of about 5 μm to about 20 μm. The separator may be, for example, an olefin-based polymer such as polypropylene; or a sheet or non-woven fabric formed of glass fibers or polyethylene. When a solid polymer electrolyte is used as the electrolyte, the solid polymer electrolyte may serve as a separator at the same time.

The separator may have a multi-layer structure including at least two layers of polyethylene, polypropylene, or polyvinylidene fluoride, and a mixed multi-layer structure may be used, wherein examples of the mixed multi-layer structure may include a two-layer separator of polyethylene/polypropylene, a three-layer separator of polyethylene/polypropylene/polyethylene, and a three-layer separator of polyroylene/polyethylene/polypropylene.

The lithium salt-containing non-aqueous electrolyte includes a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution may include an organic solvent, which may be any material available as an organic solvent in the art. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethyl ether, or a mixture thereof. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are a natural number), LiCl, LiI, or a mixture thereof. Also, in order to improve charging/discharging characteristics or flame resistance of the electrolyte, for example, the non-aqueous electrolyte may further include pyridine, triethylphosphite, triethanolamine, cyclic ether, ethylenediamine, n-glyme, hexamethyl phosphoramide, nitrobenzene derivatives, sulfur, quinone imide dyes, N-substituted oxazolidinone, N,N-substituted imidazolidine, ethyleneglycol dialkylether, ammonium salts, pyrrole, 2-methoxyethanol, or aluminum trichloride. In some embodiments, in order to impart incombustibility, the electrolyte may further include a halogen-containing solvent such as carbon tetrachloride or ethylene trifluoride.

The lithium metal battery according to an embodiment has excellent capacity and life characteristics and may thus be used in a battery cell used as a power source of a small device, and may also be used as a unit battery in a middle- or large-sized battery pack or battery module including a plurality of battery cells used as a power source of a middle- or large-sized device.

Examples of the middle- or large-sized device may include, but are not limited to, power tools and power storages for electric vehicles (EV) including a hybrid electric vehicle (HEV) and a plug-in hybrid electric vehicle (PHEV), and electric bicycles including an electric bicycle (E-bike) and an electric scooter (E-scooter).

Hereinafter, the present disclosure will be described in more detail with reference to the following examples and comparative examples. However, these examples are set forth to illustrate the present disclosure, and the scope of the present disclosure is not limited thereto.

[Preparation of Electrolyte]

Example 1

Polyethylene oxide (weight average molecular weight (Mw)=400×10³), 5.1 g of LiTFSI as a lithium salt, 1 g of $TiO_2$ particles as inorganic particles, 95 g of NMP as a solvent were mixed at 25° C. for 300 minutes to prepare a composition for forming a composite electrolyte.

The composition for forming a composite electrolyte was applied onto a collector of an electrospinning apparatus shown in FIG. 1 by the spinning of nanofibers by applying an electrostatic force of about 100 kV between spinning nozzles and the collector to prepare a composite electrolyte including a network web formed of fibers. The content of the inorganic particles ($TiO_2$) in the composite electrolyte prepared in this way was about 5 wt % based on the total weight of the composite electrolyte.

Examples 2 and 3

Composite electrolytes were prepared in the same manner as in Example 1, except that the contents of inorganic particles in compositions for a composite electrolyte were changed such that the contents of the inorganic particles ($TiO_2$) in the composite electrolytes were about 3 wt % and about 1 wt %, respectively, based on the total weight of each of the composite electrolytes.

Example 4

A composite electrolyte was prepared in the same manner as in Example 1, except that polyethylene oxide (weight average molecular weight (Mw)=1000×10³) was used instead of polyethylene oxide (weight average molecular weight (Mw)=400×10³) when preparing a composition for forming a composite electrolyte.

Comparative Example 1

A composite electrolyte was prepared in the same manner as in Example 1, except that, in a composition for forming a composite electrolyte, the weight of inorganic particles was changed to 10 g, and thus the content of the inorganic particles in the finally obtained composite electrolytes was about 10 wt %.

Comparative Example 2

First, polyethylene oxide (weight average molecular weight (Mw)=400,000), 1 g of LiTFSI as a lithium salt, and 95 g of NMP as a solvent were mixed at 25° C. for 300 minutes to prepare a composition for forming a composite electrolyte.

The composition for forming a composite electrolyte was cast and dried at 40° C. to prepare a composite electrolyte.

Comparative Example 3

A composite electrolyte was prepared in the same manner as in Example 1, except that a composition for forming a composite electrolyte was prepared by the following process.

The composition for forming a composite electrolyte was prepared by mixing polyethylene oxide (weight average molecular weight (Mw)=400,000), 1 g of LiTFSI as a lithium salt, and 95 g of NMP as a solvent at 25° C. for 300 minutes.

Comparative Example 4

A composite electrolyte was prepared by casting the composition for forming a composite electrolyte, prepared in Example 1, and drying this composition at 50° C.

Comparative Example 5

A composite electrolyte was prepared in the same manner as in Example 1, except that, in a composition for forming a composite electrolyte, the weight of inorganic particles was changed to 20 g, and thus the content of the inorganic particles ($TiO_2$) in the finally obtained composite electrolytes was about 20 wt %.

Comparative Example 6

A composite electrolyte was prepared in the same manner as in Example 1, except that, in a composition for forming a composite electrolyte, the weight of inorganic particles was changed to 30 g, and thus the content of the inorganic particles ($TiO_2$) in the finally obtained composite electrolytes was about 30 wt %.

[Lithium Metal Battery]

Manufacture Example 1

A lithium metal thin film was used as a negative electrode.

$LiCoO_2$, a conducting agent (Super-P, manufactured by Timcal Ltd.), polyvinylidene fluoride (PVdF), and N-pyrrolidone were mixed to obtain a positive electrode composition. The mixing weight ratio of $LiCoO_2$, a conducting agent, and PVdF was 97:1.5:1.5.

The positive electrode composition was applied onto an aluminum foil (thickness: about 15 μm), dried at 25° C., and then further dried in vacuum at about 110° C. to manufacture a positive electrode.

The composite electrolyte of Example 1 was interposed between the positive electrode obtained in the above process and the lithium metal thin film (thickness: about 20 μm) to manufacture a lithium metal battery (coin cell).

Manufacture Examples 2 and 3

Lithium metal batteries (coin cells) were manufactured in the same manner as in Manufacture Example 1, except that the composite electrolytes obtained in Examples 2 and 3 were used instead of the composite electrolyte obtained in Example 1.

Comparative Manufacture Examples 1 to 4

Lithium metal batteries (coin cells) were manufactured in the same manner as in Manufacture Example 1, except that the composite electrolytes obtained in Comparative Examples 1 to 4 were used instead of the composite electrolyte obtained in Example 1.

Evaluation Example 1: Scanning Electron Microscope (SEM)

The states of protective films formed on the surfaces of the lithium metal electrodes according to Examples 1 and 2 and Comparative Examples 1, 5, and 6 were analyzed using a scanning electron microscope. The analysis results thereof are shown in FIGS. 2A, 2B, and 3A to 3D. FIGS. 3A and 3B show the analysis results of Comparative Example 1, and FIGS. 3C and 3D show the analysis results of Comparative Examples 5 and 6, respectively.

Figure 2A:
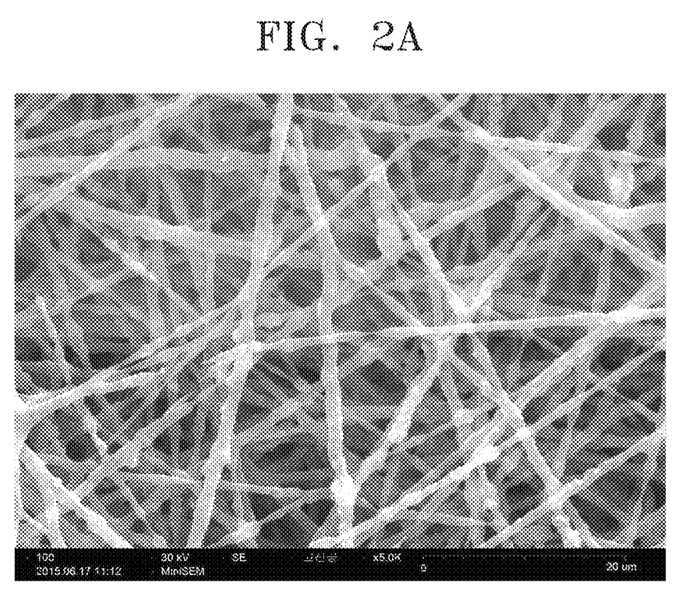
FIGS. 2A and 2B are scanning electron microscope images of composite electrolytes prepared according to Examples 1 and 2.
Figure 2B:
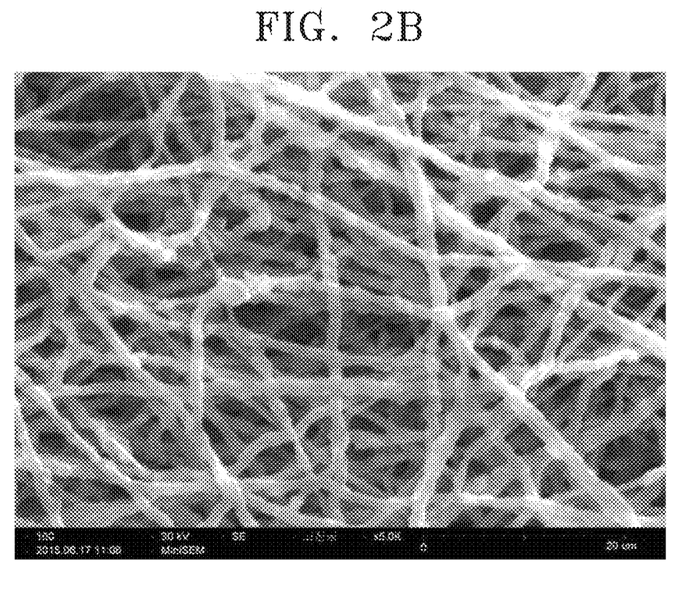
Figure 3A:
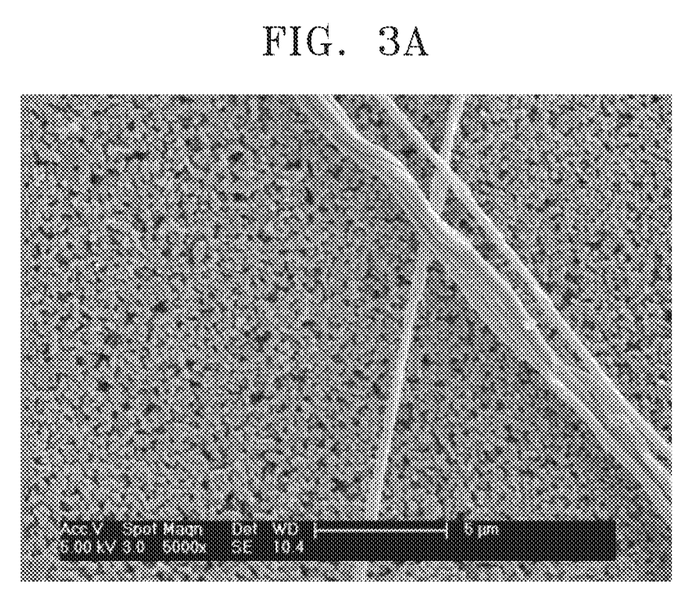
FIGS. 3A and 3B are scanning electron microscope photographs of an electrolyte according to Comparative Example 1.
Figure 3B:
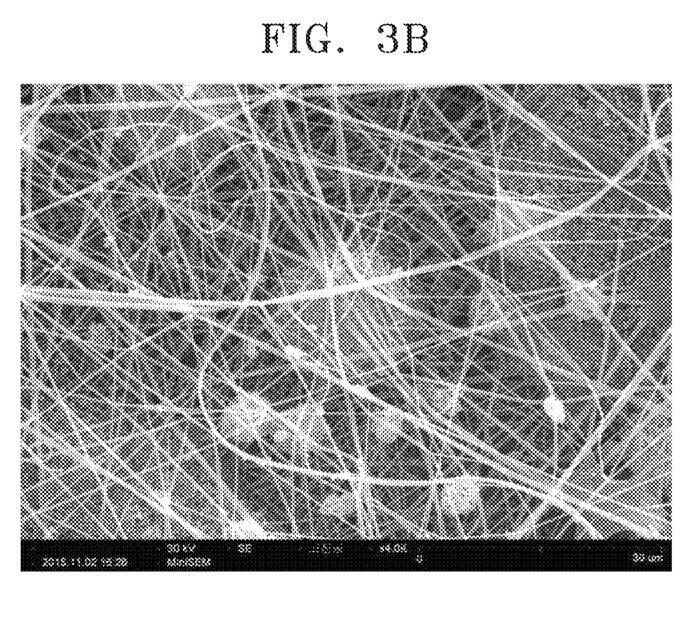
Figure 3C:
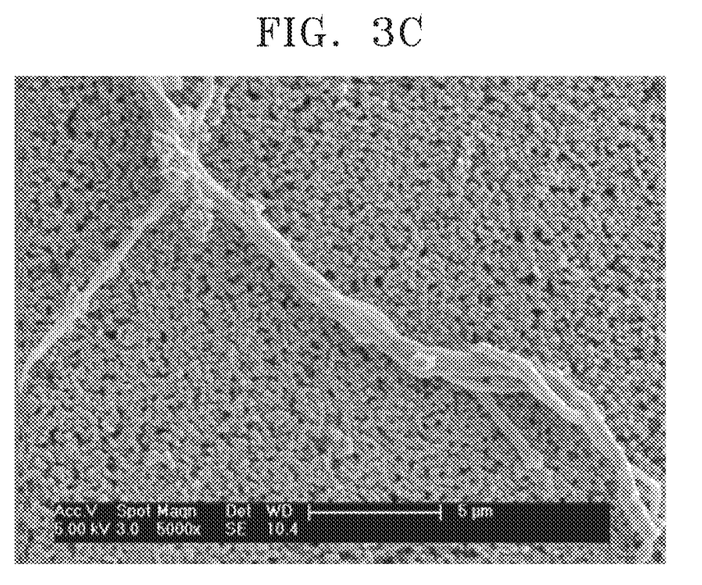
FIGS. 3C and 3D are scanning electron microscope photographs of electrolytes according to Comparative Examples 5 and 6.
Figure 3D:
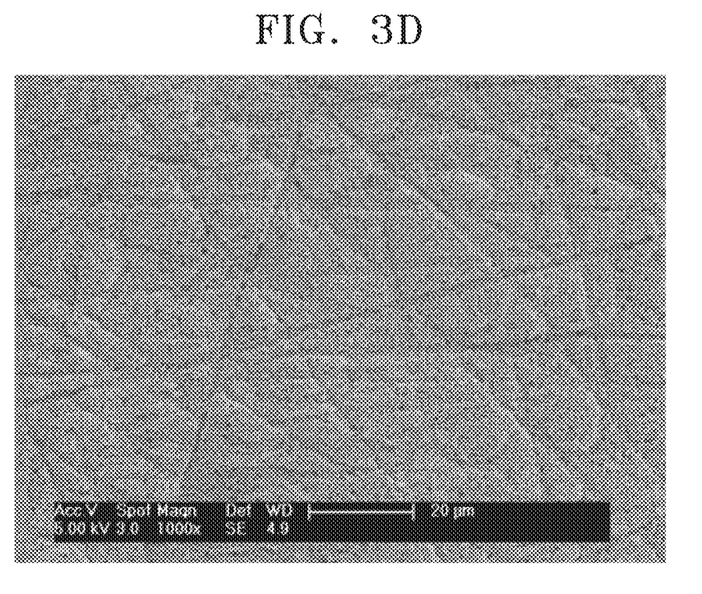

As shown in FIGS. 2A and 2B, the composite electrolytes prepared according to Examples 1 and 2 were configured such that a network web was formed by fibers containing inorganic particles.

In contrast, in the composite electrolytes prepared according to Comparative Examples 1 and 5, as shown in FIGS. 3A to 3C, the agglomeration of inorganic particles was observed, the rate of formation of polyethylene oxide into fibers was rapidly decreased, and the formation of fibers became difficult. Further, in the electrolyte prepared according to Comparative Example 6, as shown in FIG. 3D, a phenomenon that the formation of fibers becomes difficult was observed.

Evaluation Example 2: Elastic Modulus and Hardness

The hardness and elastic modulus of each of the composite electrolytes prepared according to Examples 1 and 4 were measured.

The hardness and elastic modulus thereof were measured using DMA800 (TA Instruments Inc.), and electrolyte specimens were prepared using the ASTM standard D638 (Type V specimens).

The hardness is evaluated by Equation 1 below, and the elastic modulus is evaluated by Equation 2 below.

$$H = \frac{P_{max}}{A} \qquad \text{[Equation 1]}$$

In Equation 1 above, Pmax represents an indentation load, and A represents a contact projection area.

$$E_r = \frac{1}{\beta}\frac{\sqrt{\pi}}{2}\frac{S}{\sqrt{A_p(h_c)}}, \; 1/E_r = (1-v_i^2)/E_i + (1-v_s^2)/E_s \qquad \text{[Equation 2]}$$

In Equation 2, Er represents a reduced elastic modulus, Vi represents a Poisson's ratio of an indenter, Es represents an elastic modulus of a specimen, and hc represents a contact depth. Further, Ei represents an elastic modulus of an indenter, $v_s$ represents a Poisson's ratio of a specimen, Ap represents a contact area, S represents stiffness, and β represents an indenter shape correction constant.

Figure 4:
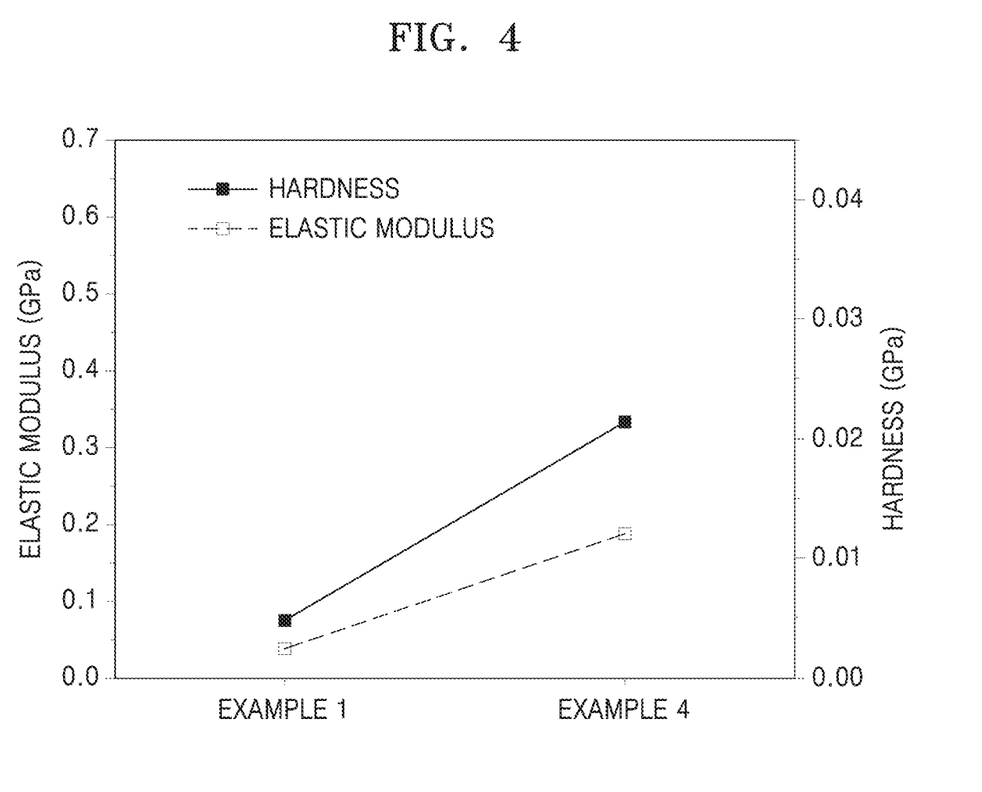
FIG. 4 illustrates the results of measuring the hardness and elastic modulus of composite electrolytes prepared according to Examples 1 and 4 and an electrolyte prepared according to Comparative Example 1.

The measurement results are shown in FIG. 4 and Table 1 below.

TABLE 1

| Class. | Hardness (GPa) | Elastic modulus (GPa) |
|---|---|---|
| Example 1 | 0.233 | 0.0397 |
| Example 4 | 0.103 | 0.1888 |

Referring to Table 1, it was found that the composite electrolytes prepared according to Examples 1 and 4 had higher hardness and elastic modulus than the electrolyte prepared according to Comparative Example 1 and had thus improved mechanical properties as compared with Comparative Example 1.

Further, referring to FIG. 4, it was found that the composite electrolyte prepared according to Example 4 had higher strength and elastic modulus than the composite electrolyte prepared according to Example 1. When the composite electrolyte having such strength and elastic modulus characteristics was used, it was more advantageous to control the growth of dendrite formed on the surface of the lithium metal negative electrode.

Figure 5:
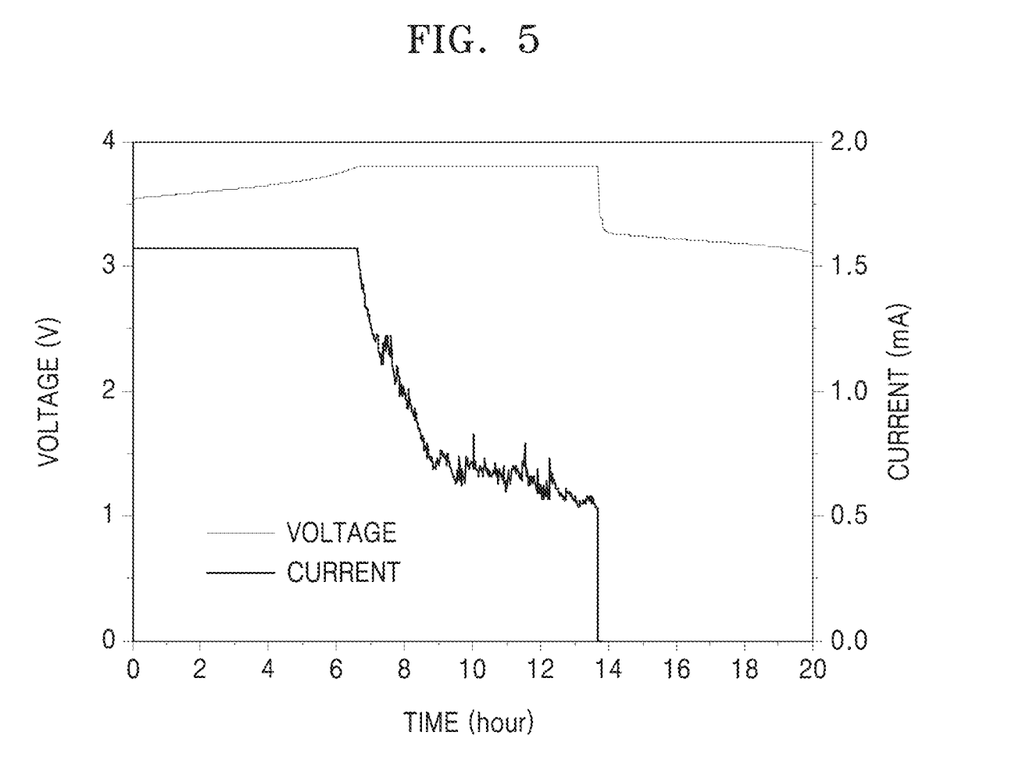
FIG. 5 illustrates the charging profile of a lithium metal battery manufactured according to Manufacture Example 1.
Figure 6:
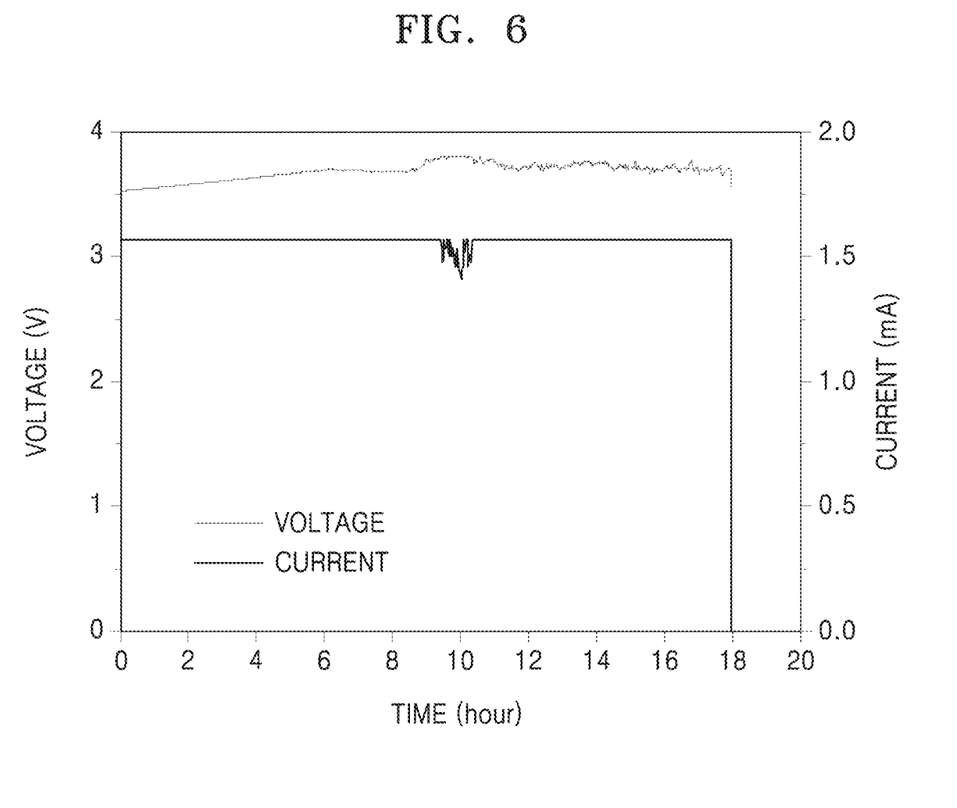
FIG. 6 illustrates the charging profile of a lithium metal battery manufactured according to Comparative Manufacture Example 4.

Evaluation Example 3: Analysis of Influence of Dendrite Through Charging Profile The lithium metal battery manufactured according to Manufacture Example 1 and the lithium metal battery manufactured according to Comparative Manufacture Example 4 were subject to constant current charging with a current rate of 0.01 C/s at 25° C. until a voltage reached 4.30 V (vs. Li), and then the changes in voltage and current over time were examined. The results thereof are shown in FIGS. 5 and 6. FIG. 5 illustrates the charging profile of the lithium metal battery manufactured according to Manufacture Example 1, and FIG. 6 illustrates the charging profile of the lithium metal battery manufactured according to Comparative Manufacture Example 4.

Referring to FIGS. 5 and 6, it was found that the lithium metal battery manufactured according to Manufacture Example 1 does not cause a fine short circuit phenomenon and can be charged and discharged. In contrast, it was found that the lithium metal battery manufactured according to Comparative Manufacture Example 4 causes a fine short circuit due to dendrite and causes a permanent short circuit due to the continuous growth of dendrite.

Evaluation Example 3: Thermogravimetric Analysis

The composite electrolyte prepared according to Example 1 was subjected to thermogravimetric analysis. The thermogravimetric analysis was carried out using TG-DTA (Thermo-Gravimetry/Differential Thermal Analyzer) STA409PC Luxx (Netzsch Corporation). The results thereof are shown in FIG. 7.

Figure 7:
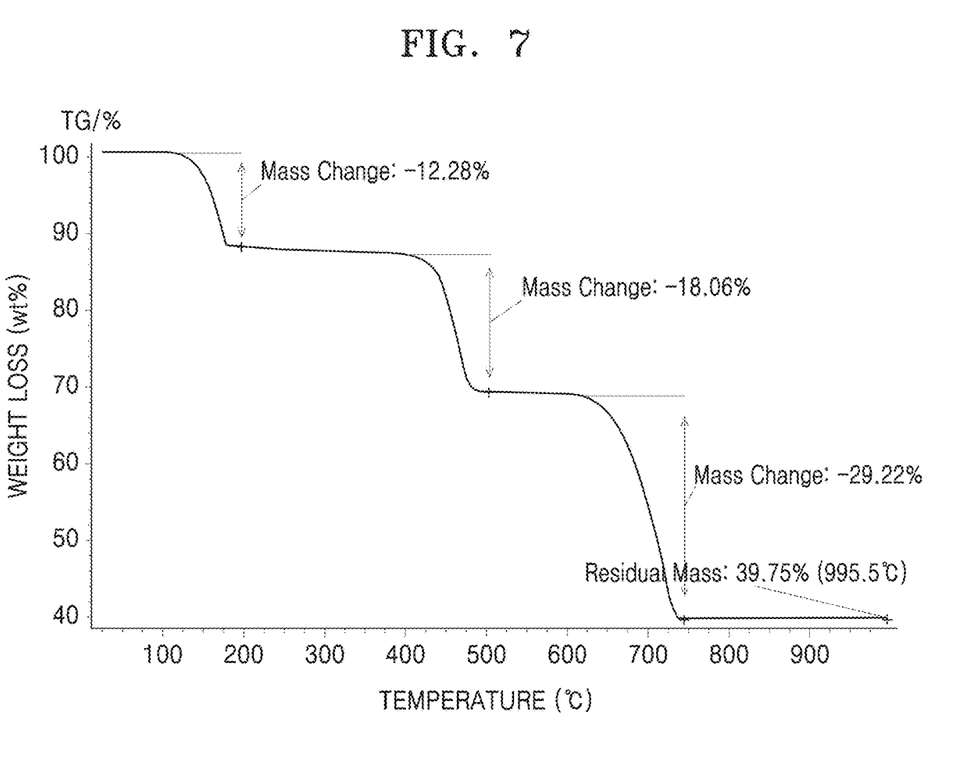
FIG. 7 illustrates the thermogravimetric analysis result of an electrolyte prepared according to Example 1.

Referring to FIG. 7, it was found that, in the composite electrolyte prepared according to Example 1, the weight ratio of inorganic particles can finally be checked through the weight change process because a polymer is first dissolved and inorganic particles finally remain.

While one or more embodiments have been described with reference to the figures, it will be understood by those of ordinary skill in the art that various changes in form and details may be made therein without departing from the spirit and scope as defined by the following claims.

The invention claimed is:

1. A composite electrolyte for a lithium metal battery, comprising:
a network web formed of a fiber containing a polymer and inorganic particles, and a lithium salt,
wherein a content of the inorganic particles is 1 wt % to 5 wt % based on a total weight of the composite electrolyte,
the polymer is polyethylene oxide,
the inorganic particles are each $TiO_2$, and
the lithium salt is lithium bis(trifluoromethanesulfonyl) imide (LiTFSI).

2. A composite electrolyte for a lithium metal battery, comprising:
a network web formed of a fiber containing a polymer and inorganic particles; and
a lithium salt,
wherein a content of the inorganic particles is 1 wt % to 5 wt % based on a total weight of the composite electrolyte,
the polymer is polyethylene oxide,
the inorganic particles are at least one selected from $SiO_2$, $TiO_2$, ZnO, $Al_2O_3$, $BaTiO_3$, and cage-structured silsesquioxane, and
the lithium salt is at least one selected from lithium bis(trifluoromethanesulfonyl) imide (LiTFSI), LiSCN, $LiN(CN)_2$, $LiClO_4$, $LiBF_4$, $LiAsF_6$, $LiPF_6$, $LiCF_3SO_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, and $LiB(C_2O_4)_2$.

3. The composite electrolyte of claim 2,
wherein the polymer has a weight average molecular weight of 400,000 to 1,000,000.

4. The composite electrolyte of claim 2,
wherein the inorganic particles have an average particle diameter of 15 nm to 25 nm.

5. The composite electrolyte of claim 2,
wherein the fiber has an average particle diameter of 500 nm to 5 μm.

6. The composite electrolyte of claim 2,
wherein the composite electrolyte has a thickness of 5 μm to 30 μm.

7. The composite electrolyte of claim 2,
wherein the composite electrolyte has a hardness of 0.01 GPa to 1 GPa at 25° C. and an elastic modulus of 0.1 GPa to 10 GPa at 25° C.

8. The composite electrolyte of claim 2,
wherein the cage-structured silsesquioxane is represented by Formula 1:

[Formula 1]

wherein, in Formula 1, $R^1$, $R^2$, and $R^3$ are each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group; and
a, b, and c are each an integer of 1 to 20, and a, b, and c are selected such that the sum thereof (k=a+b+c) satisfies 6≤k≤20.

9. The composite electrolyte of claim 8,
wherein the cage-structured silsesquioxane is represented by at least one of Formula 2 or Formula 3:

[Formula 2]

[Formula 3]

wherein in Formulae 2 and 3, $R_1$ to $R_8$ are each independently the same as described in connection with $R_1$ to $R_3$ in Formula 1.

10. A lithium metal battery, comprising:
a positive electrode;
a negative electrode; and
the composite electrolyte of claim 2 interposed between the positive electrode and the negative electrode.

11. A method of preparing the composite electrolyte of claim 2, comprising:
   preparing a composition comprising the polymer, the inorganic particles, and an organic solvent; and
   electrospinning the composition.

\* \* \* \* \*